United States Patent
Bouvier

(10) Patent No.: US 8,176,282 B2
(45) Date of Patent: *May 8, 2012

(54) MULTI-DOMAIN MANAGEMENT OF A CACHE IN A PROCESSOR SYSTEM

(75) Inventor: Daniel L. Bouvier, Austin, TX (US)

(73) Assignee: Applied Micro Circuits Corporation, San Diego, CA (US)

( * ) Notice: Subject to any disclaimer, the term of this patent is extended or adjusted under 35 U.S.C. 154(b) by 583 days.

This patent is subject to a terminal disclaimer.

(21) Appl. No.: 12/419,139

(22) Filed: Apr. 6, 2009

(65) Prior Publication Data

US 2010/0235580 A1    Sep. 16, 2010

Related U.S. Application Data

(63) Continuation-in-part of application No. 12/402,345, filed on Mar. 11, 2009.

(51) Int. Cl.
*G06F 12/08* (2006.01)
*G11C 8/00* (2006.01)

(52) U.S. Cl. ............... 711/163; 711/3; 711/6; 711/124; 711/206; 711/E12.091; 711/129; 711/130; 711/E12.001; 718/1

(58) Field of Classification Search .................. None
See application file for complete search history.

(56) References Cited

U.S. PATENT DOCUMENTS

| | | | |
|---|---|---|---|
| 7,171,539 B2* | 1/2007 | Mansell et al. | 711/203 |
| 2001/0052054 A1* | 12/2001 | Franke et al. | 711/147 |
| 2005/0188173 A1* | 8/2005 | Hasbun et al. | 711/203 |
| 2005/0273571 A1* | 12/2005 | Lyon et al. | 711/203 |
| 2008/0133834 A1* | 6/2008 | Gaither et al. | 711/118 |
| 2008/0177994 A1* | 7/2008 | Mayer | 707/201 |
| 2008/0222338 A1* | 9/2008 | Balasubramanian et al. | 710/306 |
| 2008/0244507 A1* | 10/2008 | Hodson et al. | 717/106 |
| 2008/0244599 A1* | 10/2008 | Hodson et al. | 718/104 |
| 2009/0083493 A1* | 3/2009 | Kinter | 711/141 |
| 2009/0113110 A1* | 4/2009 | Chen et al. | 711/6 |

* cited by examiner

*Primary Examiner* — Jasmine Song
*Assistant Examiner* — Daniel Bernard
(74) *Attorney, Agent, or Firm* — Law Office of Gerald Maliszewski; Gerald Maliszewski

(57) ABSTRACT

A system and method are provided for managing cache memory in a computer system. A cache controller portions a cache memory into a plurality of partitions, where each partition includes a plurality of physical cache addresses. Then, the method accepts a memory access message from the processor. The memory access message includes an address in physical memory and a domain identification (ID). A determination is made if the address in physical memory is cacheable. If cacheable, the domain ID is cross-referenced to a cache partition identified by partition bits. An index is derived from the physical memory address, and a partition index is created by combining the partition bits with the index. A processor is granted access (read or write) to an address in cache defined by partition index.

27 Claims, 11 Drawing Sheets

Fig. 1 *(PRIOR ART)*
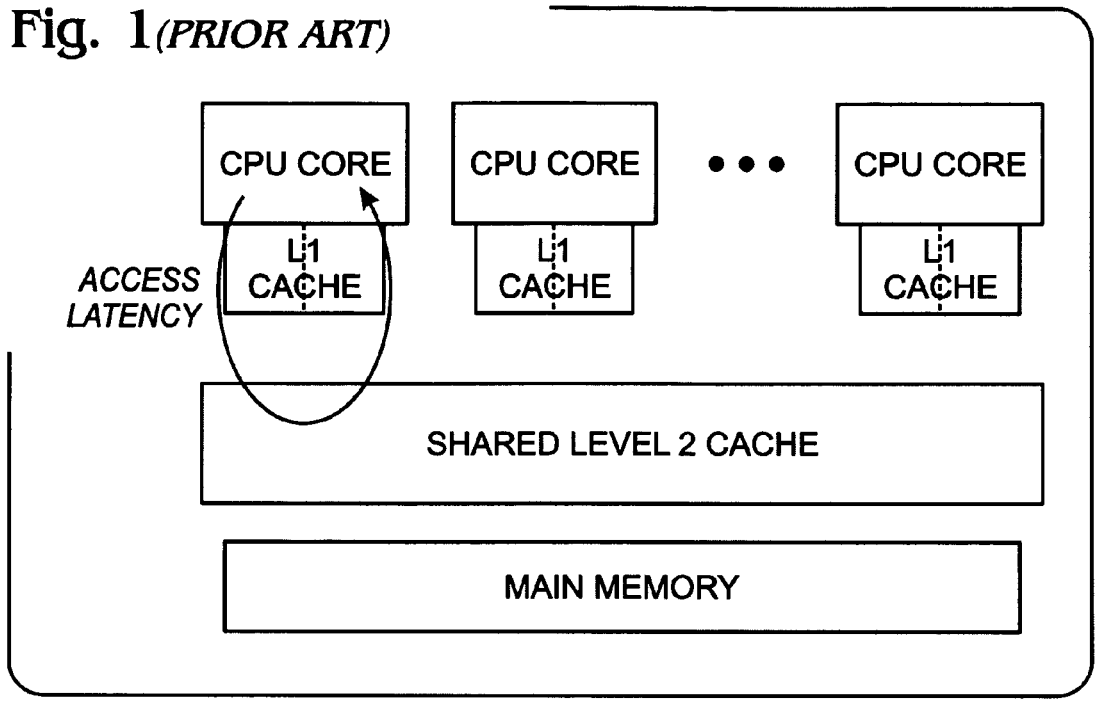
Fig. 2 *(PRIOR ART)*
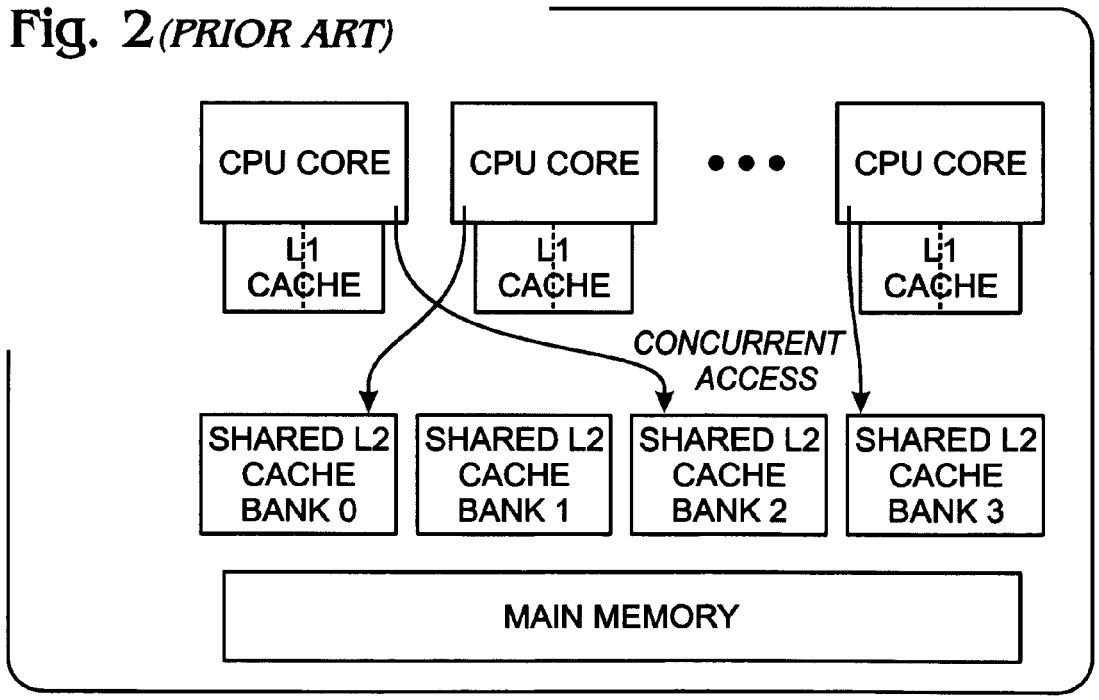

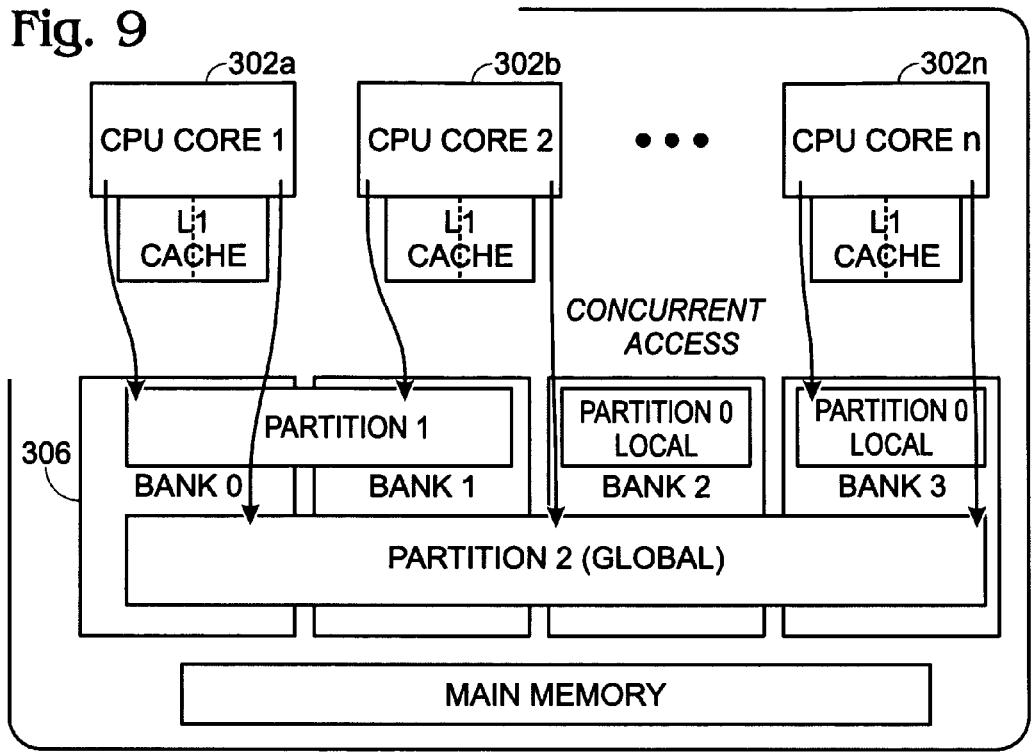
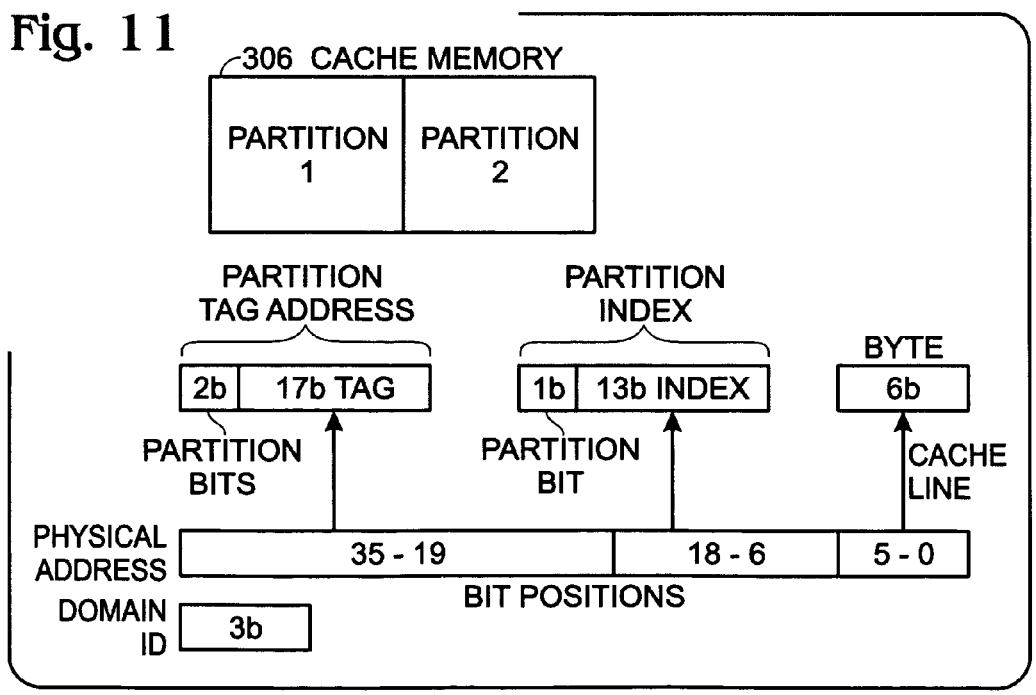

ously. However, a larger cache does improve the hit rate, which is a performance aid to a processor executing an application. Multiple cache arrays are used in a cache hierarchy within a processor to balance the need for both performance and hit rate. The processor's execution unit has the need for both low latency and high hit rate when accessing cache for its instructions and data. To resolve this dichotomy, processors employ a cache hierarchy, where the closest cache to the execution unit is typically the smallest and fastest cache, also known as the level 1 (or L1) cache. The L1 cache is backed by a larger, but slower, level 2 (or L2) cache. Sometimes the L2 is backed by even larger and slower L3 and/or L4 caches.

MULTI-DOMAIN MANAGEMENT OF A CACHE IN A PROCESSOR SYSTEM

RELATED APPLICATIONS

This application is a Continuation-in-Part of a pending application entitled, USING DOMAINS FOR PHYSICAL ADDRESS MANAGEMENT IN A MULTIPROCESSOR SYSTEM, invented by Daniel Bouvier, filed Mar. 11, 2009, Ser. No. 12/402,345, which is incorporated herein by reference.

BACKGROUND OF THE INVENTION

1. Field of the Invention

This invention generally relates to computer memory management and, more particularly, to a means for managing cache memory in a computer system.

2. Description of the Related Art

Physical memory, as used herein, is the actual memory device(s) (DRAM, SRAM, FLASH, etc.) where data is stored. In processing, two types of information are generally stored in this memory—data and instructions. Data is the working set of constants and variables that software acts upon. Instructions are the list of commands or operations that are to be carried out on the data. Access to the memory is done through an address. Each location in memory has a unique address. The address of the actual physical devices is referred to as the physical address, or sometimes, real address.

In the early days of microprocessors, the address generated by software (SW) to access a memory location, was always a physical address. The working area that contained both the instructions and the data was called the working set. In the early days one, and only one, program would execute at a time on the computer, so operations were simple. Later, the notion of operating systems and applications was introduced. This meant that more than one SW program was resident on the computer and the processor could switch back and forth between these programs. Since multiple programs had access to all of physical memory, it was possible for a bug or mistake in one program to corrupt the working set of another program. For example, if a first program made a mistake with an address pointer calculation, the wrong address might be written, perhaps overwriting the instructions for a second program. When the second program sequentially stepped through its instruction list and landed on a corrupted instruction, the computer would crash.

To get around this problem, the notion of virtual memory addressing was introduced. Each application is given a virtual address space to work within. The memory management unit and address translation mechanism permit the virtual address space to be translated to the actual physical memory where the storage of data and instructions actually exists. Alternately stated, software executes in what is called virtual address space. Each application, as well as the operating system (OS), "live" in their own virtual address map. However, the processor must ultimately use physical addresses in memory. So, an association has to be made between the virtual address space and the physical address space. The OS does this association and makes assignments to the individual applications using a memory allocation software routine.

When the system first boots, the OS builds an overall physical address map of the system. Memory is mapped in chunks called pages. A page table is built in memory by the OS with entries for each page called page table entries (PTE). Each page table entry includes the virtual page number, the associated physical page number, and any additional attribute bits related to the virtual or physical address. For example, each virtual address also includes the a Process Number associating a particular application with its physical address space.

A programmer writes their program with a specific address map in mind for the data structures to be accessed. Physical address cannot be used in the program because the programmer cannot know in advance if the addresses they might select are available or being used by another program. The memory management unit acts as a translation mechanism between the virtual address space where the program is executing and the actual physical address space where the instructions and data actually reside. As an example, when both application A and application B want to write address 0x0001 4000, a translation might be made such that the actual physical location for A is 0x00F0 1000 and for B is 0x000C 1000. This assignment of virtual to physical address translation is made by the Operating System in what is called a memory allocation routine or MALLOC.

But, if more than one operating system is being used in the system, it becomes possible for a first OS to assign the same physical address space to a first SW application, as a second OS might assign to a second application. In this circumstance, a Hypervisor and Virtualization become necessary. Now, a second level of address management software must run on the microprocessor, which assigns virtual address spaces and associated physical address translations to the individual OSs. The current art for cross-referencing virtual and physical addresses requires adding "extra" bits to the virtual side of the address, essentially expanding the virtual address. This expansion of the virtual address requires running some additional code (e.g., the Hypervisor). The advantage of this approach is that multiple OSs can then coexist on the same processor core. However, this approach does require an additional software layer (Hypervisor) to be active to manage that assignment on the virtual side.

It is not possible to use a Hypervisor if the system is using multiple heterogeneous asymmetric processors. Symmetric multiprocessing (SMP) is a system of computer architecture where two or more identical processors are connected to a single shared main (physical) memory. Further, each processor participating in the SMP system must coordinate together to manage memory. SMP systems permit any processor to work on any task no matter where the data for that task is located in memory. SMP systems can move tasks between processors to balance the workload efficiently. Asymmetric multiprocessing (AMP) refers to a system whereby multiple processors independently run operating systems with no awareness of each other. In this case there is no memory management coordination between the operating systems. Heterogeneous processors in this context are processors that have different programming models especially where memory management is concerned. Given the incompatibilities in memory management mechanisms between processors in a heterogeneous asymmetric multiprocessor, it is generally not pragmatic to use a Hypervisor.

Modern general purpose Harvard architecture processors typically include a multi-level cache hierarchy. The cache memory subsystem aids in delivering of commonly used instructions or data to the execution unit with the lowest latency possible. The average access latency is a key component to the execution performance of a software application.

The access time of a cache is based on the physical constraints of the access time of the SRAM arrays and logic associated with the cache controller. A larger cache has a physically larger array and, thus, the access latency due to lookup overhead and wire delays increases. Therefore, a processor typically has a moderately small first level cache (L1) in order to provide the best trade off in access latency vs. cache hit ratios. Subsequently, a second level cache (L2) is responsible for reducing cache miss penalty by caching a larger portion of the working set. This is done by providing a much larger cache array size, and comes with a penalty of longer access latency.

FIG. 1 is a schematic diagram depicting a plurality of processors sharing an L2 cache and main memory (prior art). It is common for systems to have software partitioned into several processes or threads. Further, it is becoming more common to break a workload or set of processes or threads across multiple processors such as in a multicore processor. In such systems, the cache hierarchy is typically shared amongst threads running on a single processor core. Further, it is often common in multicore processors to share a common L2 cache. A shared cache provides two benefits—first, data structures are shared between processors residing in a common location, thus, reducing transfer overhead from one cache to another. Secondly, not all software threads can leverage a cache equally. Some threads benefit more from a larger cache because they have a larger working set than other threads. Given that the exact workload that a processor will run in the future is not known when a processor is designed, it is usual practice to provide as large a cache as economically and physically practical. For a multicore device, an independent cache hierarchy can be provided for each processor. This cache hierarchy comes at the cost of potentially great inefficiency with respect to the resulting size, power, and cost. Instead, a shared cache (e.g., L2) is used when practical.

Certain applications require deterministic behavior as part of their operating characteristics. For example, real-time or deadline based computing often found in embedded applications requires a certain amount of computation be completed within a predetermined time period. Given a cache shared by multiple concurrent software processes, and further by multiple processors, the access latency for a thread is not guaranteed to be consistent due to the varied interactions of the other threads.

One solution has been to allow software configurable partitioning of the shared cache based on each physical processor that is sharing the cache. Such partitioning is implemented as part of the cache allocation scheme of the cache controller. For a two-CPU system, software running on CPU A is allocated use of space A in the cache, while CPU B is allocated space B. Such partitioning is very coarse and does not allow for inter-processor behaviors, especially where larger numbers of cores exist. Further, it does not address the specific behaviors and needs of different software operating on the same processor core.

The reduction in performance and access determinism is primarily due to two factors—the first is cache line replacement. This is the case where two or more threads are concurrently sharing a common cache. As these threads interact with the cache they compete for the limited resource, thus, randomly replacing cache elements that the other is potentially using, now or in the near future. In this circumstance, a change of code in one thread may adversely impact the performance of another thread.

The second item that impacts cache access latency is blocking. Blocking is the condition whereby two processors are accessing a common cache tag in order to examine if the desired cache element is currently resident in the cache. Since coherency must be maintained, one and only one access to a particular cache address can occur at a time.

FIG. 2 is a schematic diagram of a multi-processor system using an L2 cache bank (prior art). Larger shared caches have deployed the notion of cache banks. A cache of dimension X can be partitioned into N banks each of dimension Y. The banks each cache a smaller portion of the overall address space. Partitioning the cache into banks enables concurrent access. Such partitioning can be done using a low-level address-interleave. Conceptually, software randomly accesses memory locations located across the banks, thus enabling more concurrent accesses and a net reduction in average access latency.

It would be advantageous if a mechanism existed that permitted a cache memory to be efficiently partitioned and/or shared between multiple processors, multiple OSs, or multiple applications.

SUMMARY OF THE INVENTION

Disclosed herein is a means to enable combined subsystems on a multicore processor with configurable partitioning. For example, some cores might be dedicated to a symmetric multiprocessing (SMP) shared memory domain, while others may work in separate partitions as individual single core subsystems. The invention provides a mechanism whereby cache can be partitioned into 2 or more domains (cache partitions). Each domain describes an amount of space that is eligible for cache allocation by that domain. Software threads and the memory working space used by them can thereby be associated with a specific domain and therefore take advantage of that particular portion of the cache. In this way some threads may be allowed full access to the cache while others may be allowed access to only a portion of the cache.

Accordingly, a method is provided for managing cache memory in a computer system. A cache controller portions a cache memory into a plurality of partitions, where each partition includes a plurality of physical cache addresses. Then, the method accepts a memory access message from the processor. The memory access message includes an address in physical memory and a domain identification (ID). A determination is made if the address in physical memory is cacheable. If cacheable, the domain ID is cross-referenced to a cache partition identified by partition bits. An index is derived from the physical memory address, and a partition index is created by combining the partition bits with the index. A processor is granted access (read or write) to an address in cache defined by partition index.

If a first memory access message, having a first address in physical memory and a first domain ID, is accepted in sequence with a second memory access message, having a second address in physical memory and a second domain ID, the first and second domain IDs may be cross-referenced to a shared first cache partition. Then, the processor (or processors) associated with the first and second memory access messages is sequentially granted access to the first and second cache addresses in the first cache partition.

Additional details of the above-described method, and a computer system for managing cache memory, are provided in more detail below.

BRIEF DESCRIPTION OF THE DRAWINGS

FIG. 1 is a schematic diagram depicting a plurality of processors sharing an L2 cache and main memory (prior art).

FIG. 2 is a schematic diagram of a multi-processor system using an L2 cache bank (prior art).

FIG. 9 is a schematic block diagram depicting a system with four L2 memory banks.

FIG. 11 depicts the process of generating a partition index, with 1 partition bit, from a physical address.

DETAILED DESCRIPTION

Figure 3:
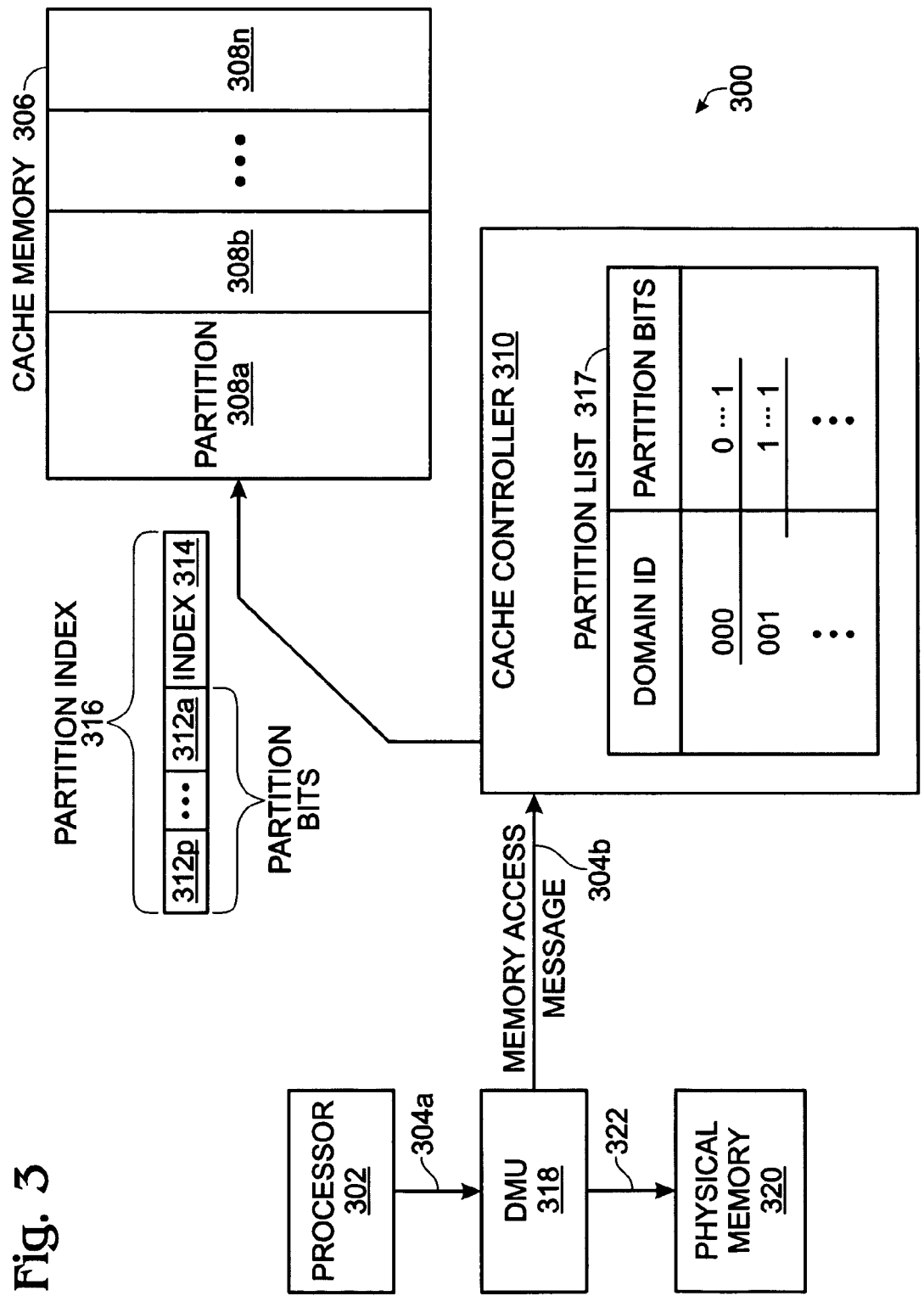
FIG. 3 is a schematic block diagram of a computer system for managing a cache memory.

FIG. 3 is a schematic block diagram of a computer system for managing a cache memory. The system 300 comprises a processor 302 having an address interface on line 304 for sending a memory access message including an address in physical memory and a domain identification (ID). For example, processor 302 may be a general purpose computer processing unit (CPU) or a data management application (DMA) engine. The CPU and the DMA engine have completely different memory management models. As another example, the processor may be an ARM processor and a PowerPC processor. There are a number of other processing devices existing that are well known by those with skill in the art, and the system 300 is not limited to any particular type of processor, microprocessor, or computing device. As used herein, a heterogeneous multi-processor system uses different types of processors—having different functionality and programming models. That is, heterogeneous processors use different algorithms to translate between virtual addresses and (real) addresses in a physical memory. Homogeneous processors have the exact same functionality and programming model. The term asymmetric means that the system is running multiple operating systems that are essentially unaware of each other but sharing a common memory system.

A cache memory 306 is portioned into a plurality of partitions 308, where each partition includes a plurality of physical cache addresses. Shown are partitions 308a through 308n, where n is a variable not limited to any particular value. The cache memory 306 may be comprised of a single physical memory device, or a plurality of physical devices. A cache controller 310 has an interface on line 304 to accept the memory access message from the processor 302. The cache controller 310 determines if the address in physical memory is cacheable, and if cacheable, cross-references the domain ID to a cache partition 308 identified by partition bits 312. The cache controller may be enabled using state machine and combinational logic. Alternately, portions of the cache controller may be enabled as a software application comprised of processor instructions stored in memory, which are executed by a processor.

The cache controller 310 derives an index 314 from the physical memory address, and creates a partition index 316 by combining the partition bits with the index. In this manner, the cache controller 310 grants the processor 302 access to an address in cache 306 defined by partition index 316. In one aspect, a partition list 317 is used cross-referencing domain IDs to partition bits.

As defined herein, "access" means either the reading of a cache line from cache (tag hit), or the writing of data into cache, if it is determined that the data is not already resident in the cache (tag miss). Partition bits 312a through 312p are shown, where p is a variable not limited to any particular value. In one aspect of the system, the partition bits are the most significant bits of the partition index. Thus, the cache partitions are identified using the partition bits, and where $2^p$ partitions are possible. Also shown are a domain mapping unit (DMU) 318 and physical memory 320. The partitioning of cache is analogous to the creation of domains in physical memory, and details of the DMU are provided in the above-referenced parent application. The memory access message is initially passed to the DMU 318 on line 304a, before being passed to main physical memory 320 on line 322, or to the cache controller on line 304b.

In one aspect, the cache controller 310 accepts a memory access message with an address in physical memory and a domain ID that is not recognized. The domain ID may not be recognized because the domain ID source has not been granted access to cache, or because of a machine error. If the domain ID is not recognized, the cache controller may ignore the memory access message, cross-reference the domain ID to a default cache partition, or originate a processor machine check error message.

In another aspect, the cache controller 310 sequentially accepts a first memory access message with a first address in physical memory and a first domain ID, and a second memory access message with a second address in physical memory and a second domain ID. The term "sequential" merely indicates that the two memory access messages need not be received simultaneously. Neither must the sequential messages be consecutive messages. For example, the first memory access message may originate from the processor 302, and the second memory access message may originate from a second processor (not shown). Alternately, as described in more detail below, the two memory access messages may originate from the same processor running different software applications or operating systems (OSs), where different applications or OSs are associated with the messages. Regardless of the source, the cache controller 310 may cross-reference the first and second domain IDs to a shared first cache partition (e.g., partition 308a). If that is the case, the cache controller grants access to the first and second cache addresses in the first cache partition. However, it should be understood that not all cache partitions are necessarily shared.

Figure 4:
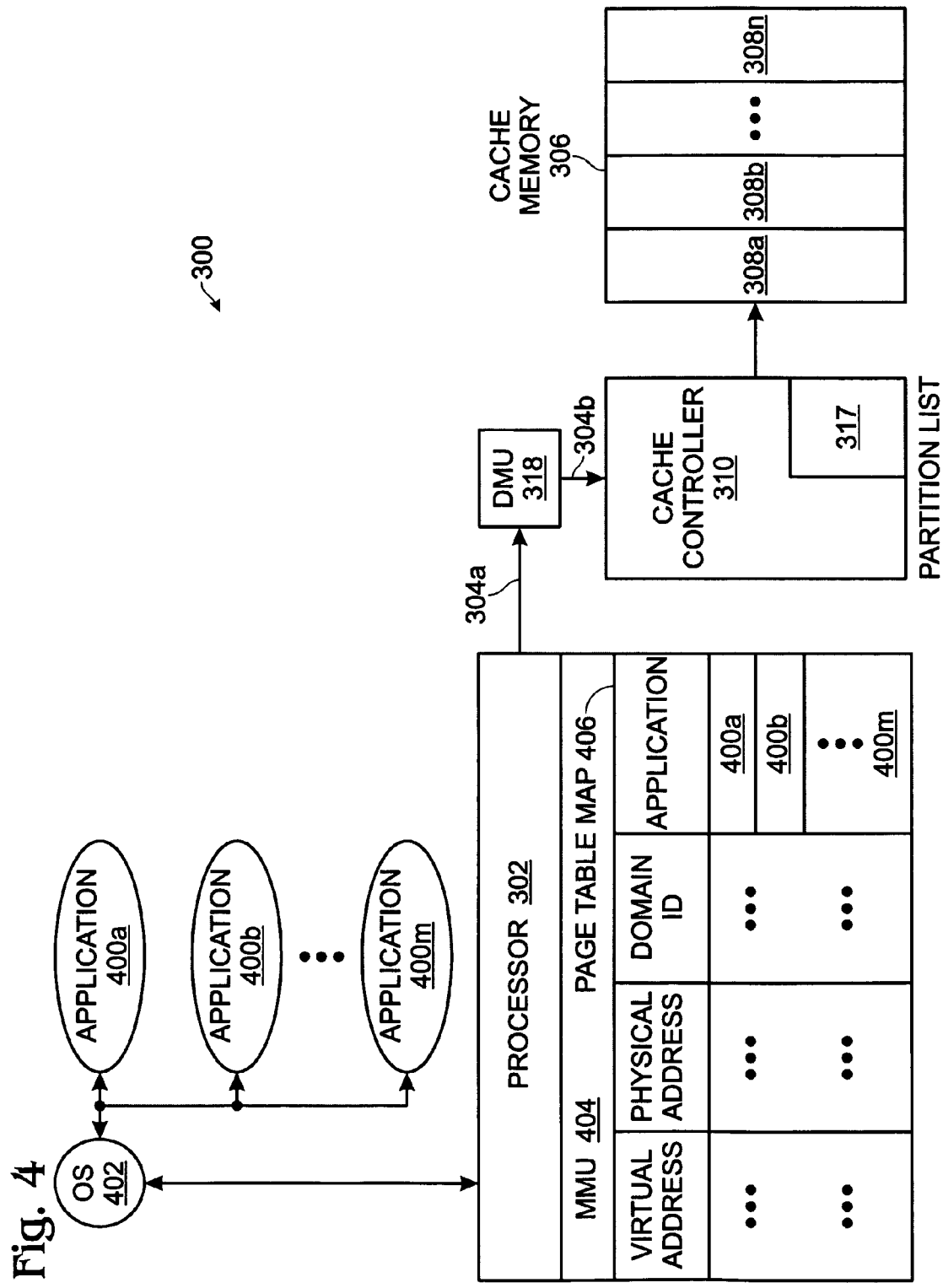
FIG. 4 is a schematic block diagram depicting a first variation of the computer system for managing cache memory.

FIG. 4 is a schematic block diagram depicting a first variation of the computer system for managing cache memory. Shown is a plurality of applications 400a through 400m, where m is a variable not limited to any particular value. The applications 400 are each enabled as processor readable code. For convenience, the applications are shown as modules, but it should be understood that an application or program is made up of instructions stored in a memory that are operated upon by a processor.

Also shown is OS 402, which allocates a unique portion of virtual memory to each application. OS 402 is enabled as computer readable code. For convenience, the OS is shown as a module, but it should be understood that an OS is a type of software application made up of instructions stored in a memory that are operated upon by a processor. These instructions may be referenced using virtual addressing. However, the OS instructions are actually stored in a physical memory. More explicitly, an OS is responsible for the management of software applications, the coordination of activities, and the sharing of computer resources. By using the OS as an interface to the hardware, an application is relieved of management details, making the applications easier to write. Applications access OS services through application programming interfaces (APIs) or system calls. By invoking these interfaces, the application can request a service from the operating system, pass parameters, and receive the results of the operation.

The processor 302 includes a memory map unit (MMU) 404 with a page table map 406 of virtual memory addresses for each application cross-referenced to addresses in the physical memory, and the domain ID associated with each address in physical memory. Each application 400 is assigned a unique domain ID.

An MMU is a computer hardware component responsible for handling accesses to memory requested by a processor. For example, the MMU 404 may be embedded in a load store unit of a processor, which connects the processor to the memory system. An MMU typically divides the virtual address space into pages, each having a size which is a power of 2, usually a few kilobytes. The bottom n bits of the address (the offset within a page) are left unchanged. The upper address bits are the (virtual) page number. The MMU normally translates virtual page numbers to physical page numbers via an associative cache called a Translation Lookaside Buffer (TLB), which is also referred to as page table map 406. The data found in such a data structure is typically called a page table entry (PTEs), and the data structure itself is typically called a page table. The physical page number is typically combined with the page offset to give the complete physical address.

Each TLB entry typically carries descriptors that tell the system hardware how to treat memory accesses. Some example descriptors include address space cacheability, globally visibility, write through vs. write back, process number, and the allocation policy to be followed. Globally visible refers to an address space that is shared by other processors and associated caches, thus requiring a mechanism to maintain coherency. As described in more detail below, the use of cache partitions resolves performance issues associated with the use of global visibility. In addition to the table entry including the virtual page number and associated physical page number, the above-mentioned descriptors may be added as additional attribute bits related to a virtual or physical address.

More explicitly, additional attribute bits are added to the physical side of the PTEs, called domain bits (domain ID). During typical operation, domain mappings are made during system initialization. Each OS is assigned to one or more domains and given those numbers (domain IDs). If multiple OSs coexist sharing the same physical address space, then the domain mechanism is used to make sure that one OS doesn't allocate or use a non-assigned physical address space.

During runtime, the OS or an application calculates and generates address pointers within their allocated virtual memory space. When a load or store instruction occurs, the virtual memory address lookup occurs in the processor's MMU. This lookup results returns the associated physical address and the additional attribute (domain) bits.

The cache controller 310 sequentially accepts memory access messages associated with each application 400, cross-references domain IDs to cache partitions, and grants each application access to addresses in a corresponding cache partition. That is, upon receiving a memory access message, the cache controller uses that domain IDs to derive partition bits and create partition indexes, so that each application can access a unique partition in cache memory. However, as noted in the explanation of FIG. 3, it is possible for some, or all applications to share a cache partition.

In one aspect, the OS 402 is assigned addresses in a physical memory domain at initialization, builds the page table map, and loads the page table map into the MMU 404. Likewise, the cache controller 310 builds a partition list 317 to cross-reference domain IDs to partition bits at initialization.

Figure 5:
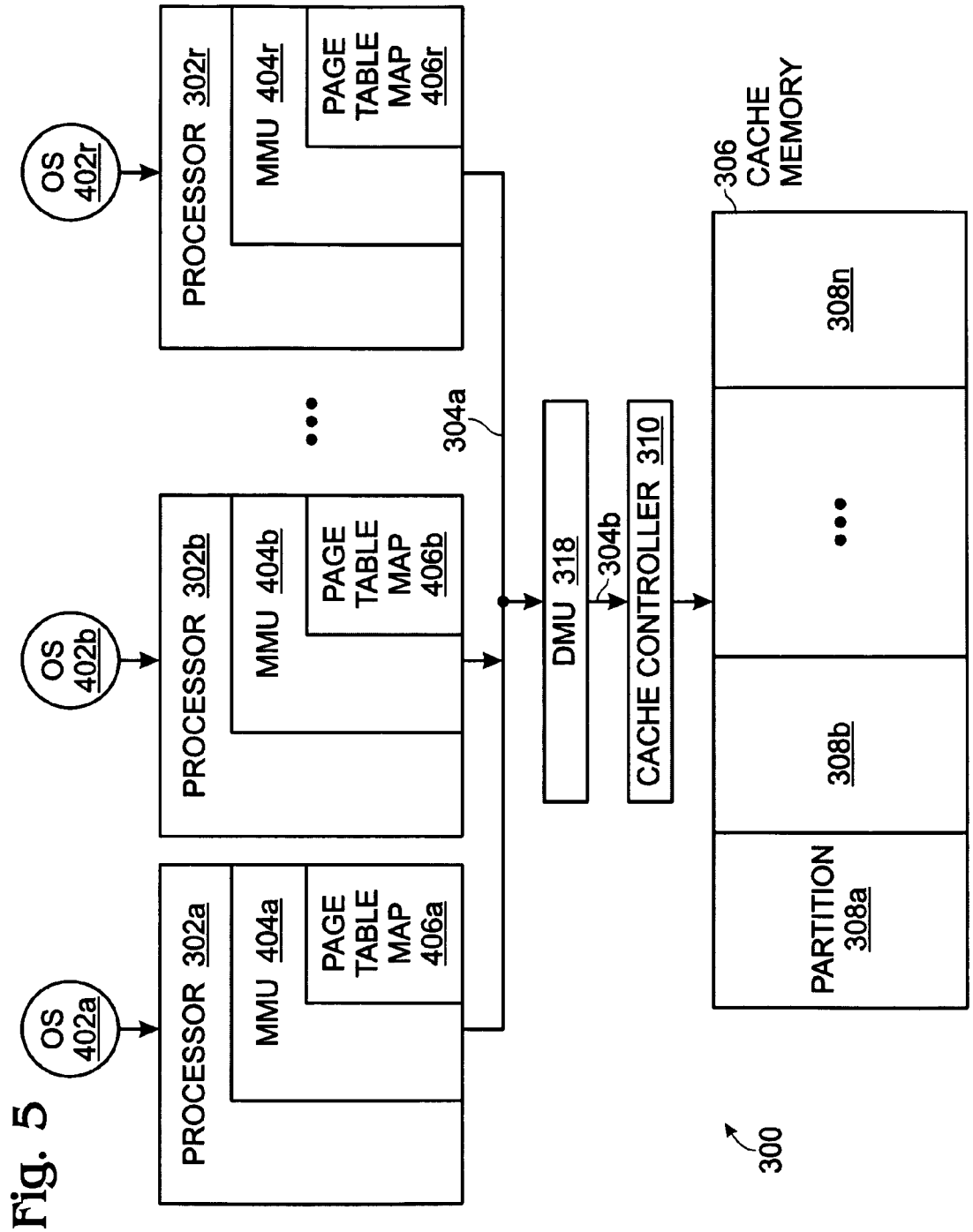
FIG. 5 is a schematic block diagram depicting a second variation of the computer system for managing cache memory.

FIG. 5 is a schematic block diagram depicting a second variation of the computer system for managing cache memory. In this aspect, the system 300 comprises a plurality of processors 302. Shown are processors 302a through 302r, where r is a variable not limited to any particular value. Each processor 302 includes an MMU 404. At least two of the processors (e.g., 302a and 302b) are heterogeneous processors having different MMU algorithms for associating virtual addresses to addresses in physical memory. Each MMU 404 includes a page table map 406 of virtual memory addresses cross-referenced to addresses in the physical memory identified with a unique domain ID. The cache memory 306 includes a unique cache partition associated with each of the heterogeneous processors. For example, partition 308a may be associated with processor 302a and processor 302b may be associated with partition 308b.

Alternately, processors 302a through 302r may be homogeneous processors. As above, each processor 302 includes an MMU 404. Each processor 302 receives a request to access virtual memory addresses from a corresponding OS 402, and accesses its corresponding MMU to recover cross-referenced addresses in physical memory and associated domain IDs. For example, processor 302a receives a request from OS 402a, and accesses MMU 404a. Each process 302 sends the addresses in physical memory and domain IDs to the cache controller 310 as memory access messages. The cache memory 306 includes a unique cache partition associated with each homogeneous processor.

In another aspect, the MMUs 404 for the first processor 302a and the second processor 302b include a map of virtual memory addresses cross-referenced to addresses in the physical memory identified with a shared first domain ID, not shared with the third processor 302r. If the cache controller 310 receives a memory access message with an address in physical memory and the first domain ID from the first processor, the cache controller determines if the first domain ID is shared with another processor, and since it is shared, sending a notification (snoop) message to the second processor 302b, but not the third processor 302r, that data in a shared cache partition is being accessed.

Figure 6:
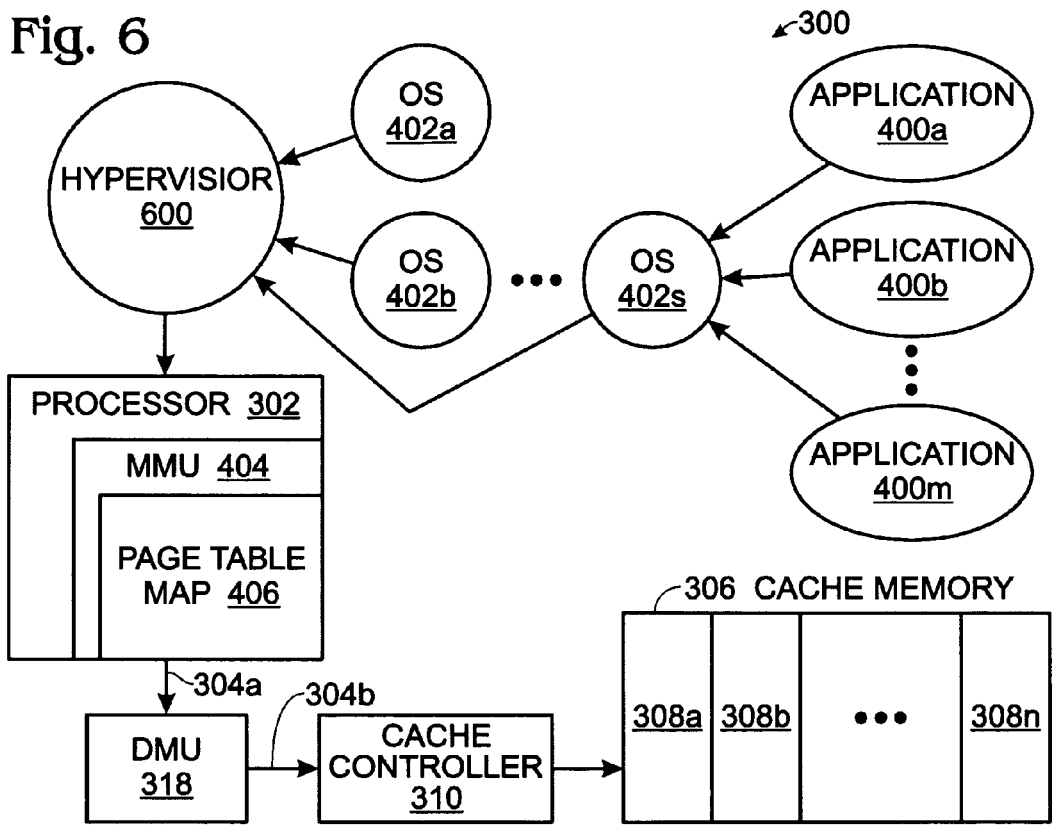
FIG. 6 is a schematic block diagram depicting a third variation of the computer system for managing cache memory.

FIG. 6 is a schematic block diagram depicting a third variation of the computer system for managing cache memory. In this aspect the system 300 comprises a single processor 302 associated with a plurality of OSs 402a through 402s, where s is variable not limited to any particular value. As described above, the OSs are enabled as computer readable code. A hypervisor 600 may be interposed between the OSs 402 and the processor to manage virtual addresses. Details of hypervisor functions have been provided in the Background Section, above. The processor 302 includes an MMU 404 with a page table map 406 of virtual addresses cross-referenced to addresses in the physical memory identified with a unique domain ID. The processor 302 receives requests to access virtual memory addresses from the plurality of OSs 402, and accesses the MMU 404 to recover cross-referenced addresses in physical memory and associated domain IDs. The processor 302 sends the addresses in physical memory and domain IDs to the cache controller as a sequence of memory access messages. The cache memory 306 includes a unique cache partition associated with each OS. Alternately, some or all the OSs may share cache partitions.

Figure 7:
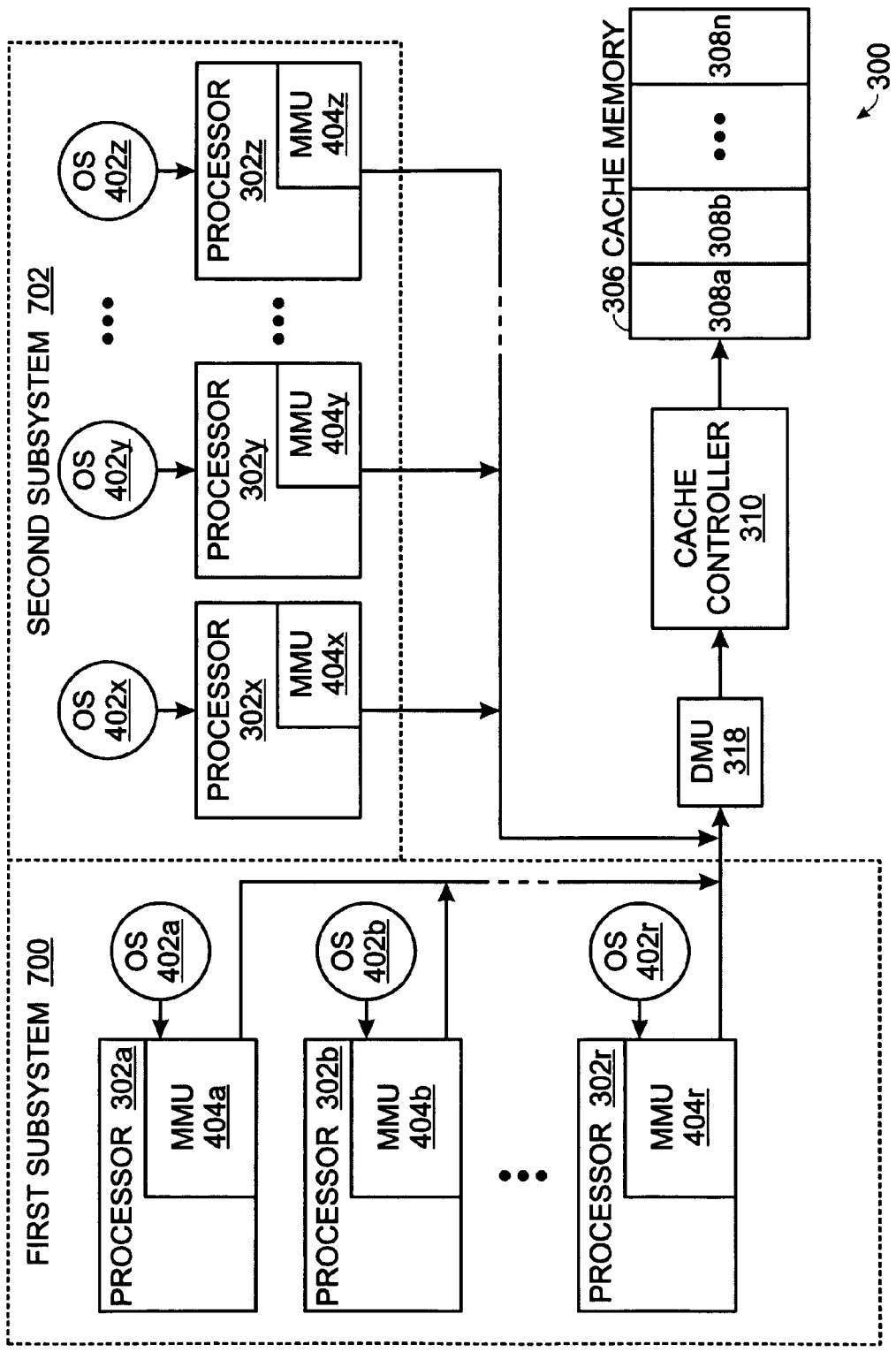
FIG. 7 is a schematic block diagram depicting a fourth variation of the computer system for managing cache memory.

FIG. 7 is a schematic block diagram depicting a fourth variation of the computer system for managing cache memory. The system 300 comprises a plurality of OSs 402 enabled as processor readable code. A first subsystem 700 includes a plurality of symmetric processors 302a through 302r. Each symmetric processor 302a through 302r includes an MMU 404. A second subsystem 702 includes a plurality asymmetric processors 302x through 302z. Each asymmetric processor 302 includes an MMU 404. Each MMU 404 includes a map of virtual memory addresses cross-referenced to addresses in the physical memory identified with a unique domain ID. Each processor 302 from the first subsystem 700 and the second subsystem 702 receives requests to access virtual memory locations from its OS 402, and accesses its MMU 404 to recover cross-referenced addresses in physical memory and associated domain IDs. Each processor 302 sends the addresses in physical memory and domain IDs to the cache controller 310 as memory access messages. The cache memory 306 includes a unique cache partition associated with each processor in the first and second subsystems. As an alternative, some or all the homogeneous processors may share cache partitions.

Functional Description

Figure 8:
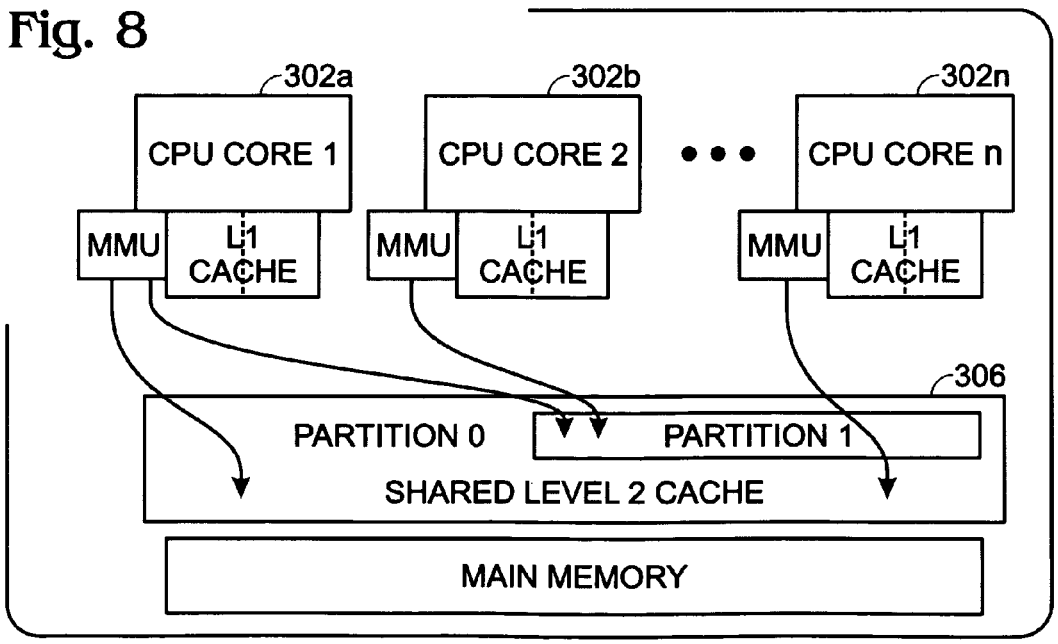
FIG. 8 is a schematic block diagram depicting a system where L2 cache is partitioned.

FIG. 8 is a schematic block diagram depicting a system where L2 cache is partitioned. Partition 0 is shared by CPU core 1 and CPU core n, while partition 1 is reserved exclusively for CPU core 2. Each partition describes an amount of space that is eligible for cache allocation. Software threads and the memory working space used by them can thereby be associated with a specific domain or partition and, therefore, take advantage of that particular portion of the cache. In this way, some threads may be allowed full access to the cache while others may be allowed access to only a portion of the cache. For example, a group of processes might share a single partition in the L2 cache, while another more important process might be assigned to its non-shared partition, so as to guarantee that its cache behavior is not affected by the other processes.

Additional attributes, i.e. a domain ID, indicates the cache domain with which an address space is to be associated. For each access to a particular address space, the domain attribute is used to designate the specific treatment and allocation policy to carry out within the cache. The attribute is presented to the cache controller along with the address to be accessed. Only the portion associated with the configurable domain will be accessed in the cache.

FIG. 9 is a schematic block diagram depicting a system with four L2 memory banks. Partition 2 extends across all the banks and is shared by all the processors. In this example, domain IDs can be used to indicate how many banks and which portion within a bank is associated with a particular address space. The domain IDs are then used by the cache subsystem to steer addresses to one bank or another depending on the configuration of the cache.

Figure 10:
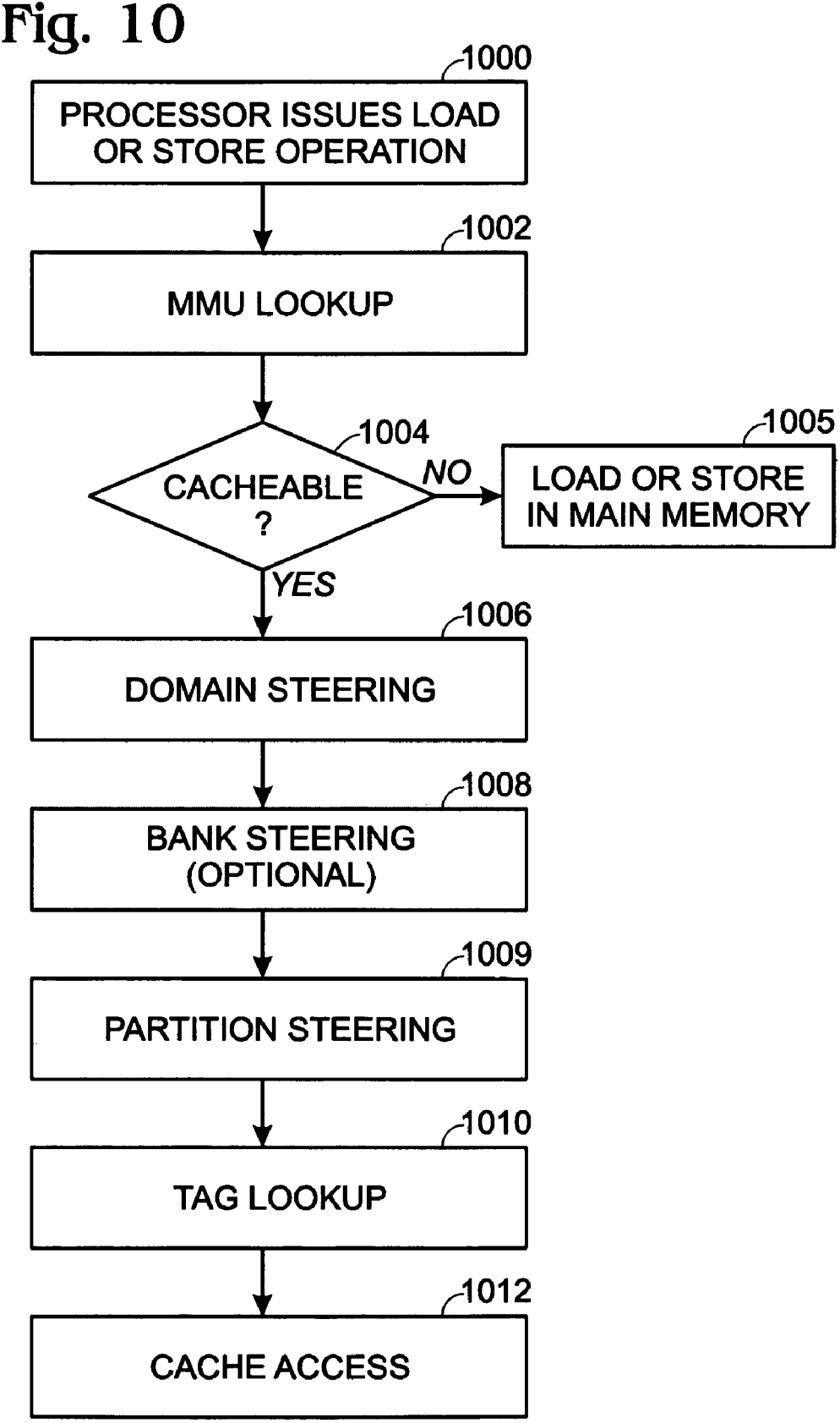
FIG. 10 is a flowchart illustrating a transaction flowing from the processor to the cache memory subsystem.

FIG. 10 is a flowchart illustrating a transaction flowing from the processor to the cache memory subsystem. Inclusions of domain bits as well as domain based steering to specific regions are the additional steps to the historical transaction flow. In Step 1000 the processor issues a load or store operation and a virtual address is generated. In Step 1002 an MMU lookup is performed. A physical address and domain ID are obtained. In Step 1004 a determination is made if the address is cacheable. If no, in Step 1005 a load or store operation proceeds to physical memory. If yes, Step 1006 applies domain steering. A domain ID is used to determine the associated cache partition. If there are multiple banks of cache, Step 1008 performs bank steering. For example, lower order address bits may be used to steer the transaction to proper bank and tag. Step 1009 performs partition steering, converting the domain ID into partition bits, which direct cache access to the proper partition. A tag lookup is performed in Step 1010. If there is a tag hit, then service data is tenured. If there is a tag miss, the cache controller implements a replacement procedure. In Step 1012, access is granted to the cache address.

The cache controller may be software programmable, with settings to adjust the allocation policy for each domain, which allows allocation to more or less of the total capacity of the cache. The application of domain attributes and a software configurable allocation policy may span across a multibank cache. Attributes further indicate how a bank or set of banks is partitioned and enables steering to the appropriate bank. The application of domain attributes across multiple independent processes and operating systems permit independent subsystems to be configured in a shared cache.

The above-described cache controller permits the simultaneous use of a large unified cache, while allowing portions of the cache to be set aside and associated with a specific subsystem. The cache controller also enables combined subsystems on a multicore processor with configurable partitioning. For example some cores may be dedicated to an SMP shared memory domain, while others may be working in separate partitions as individual single core subsystems.

Thus, in one aspect, cache partitioning permits the configuration of multiple hardware managed coherence domains. Take the case of a quad processor core device. In order to make the device perform as 2 dual core subsystems, there must be a way for the software to instruct the hardware of physical memory regions associated with a domain. In this way, data accesses for one pair of processors do not interfere with transaction traffic for the other pair. In addition to providing physical address protection, performance advantages are also incurred. First, software may be used to control which portions of the cache are to be allocated to certain applications. Second, the overhead for maintaining hardware is removed. Cache coherency is created by more intelligently steering snoop traffic to only the processors that are part of the particular coherence domain. A coherence domain is defined as an address space where two or more processors share data. In the prior art, all processors are either "snooped" or they're not, based on a single "global coherence" attribute in the TLB for a particular memory page. The invention described herein is much more efficient, as only the processors sharing the same cache partition or physical address domain are snooped.

For example, a conventional cache management system with a 4-core device may have a dedicated level 1 (L1) cache for each core. Cores 0 and 1 are configured in an SMP cluster so they have an address space that is denoted with a common Domain ID. Cores 2 and 3 are unrelated and doing a completely different task. A common coherence controller is responsible for monitoring messages from each processor and making sure that the L1 caches remain consistent. The job of the coherence controller is to make sure that memory stays consistent when multiple processors are modifying memory locations. Consider that processor 0 has loaded an address into its L1 cache. Then, processor 0 modifies the data at the address. Subsequently, processor 1 wishes to do the same. It is the responsibility of the coherence controller to monitor the memory request messages for each core and to query the other core to make sure its cache stays current. So, upon receiving the request from processor 1, the coherence controller first queries processor 0 (snoop), checks whether it has a copy, and instructs it to invalidate that copy or write it back to memory. Once that is done, processor 1 is free to continue with its operation. However, the coherence controller has no idea which processors are participating in sharing of the memory location. So all processors must be snooped. This snooping has performance implications in higher core count systems, as snooping degrades performance.

However, the present invention cache controller takes domain ID into account. When it receives a message with a domain ID, it cross-references the domain ID to see which other processors are part of a shared domain. It then only queries (snoops) those processors that are in the shared domain, leaving the other processors alone and able to go on about their business.

FIG. 11 depicts the process of generating a partition index, with 1 partition bit, from a physical address. A memory access message with a 36 bit (36 b) physical address and 3 b domain ID are received. The domain ID is cross-referenced to partition bits (3 b). The 6 least significant bits of the physical address are not needed, as a 6 b cache line is accessed. Bit positions 18 through 6 of the physical address are the index. One of the partition bits is added to create the partition index. Since there are only two partitions, only a single partition bit is needed. Bit positions 19 through 35 of the physical address form a portion of the tag. Two partition bits are added to the tag, to form a partition tag address. Note: the system is not limited to a particular number of physical address, domain ID, index, partition index, or partition bits.

Figure 12:
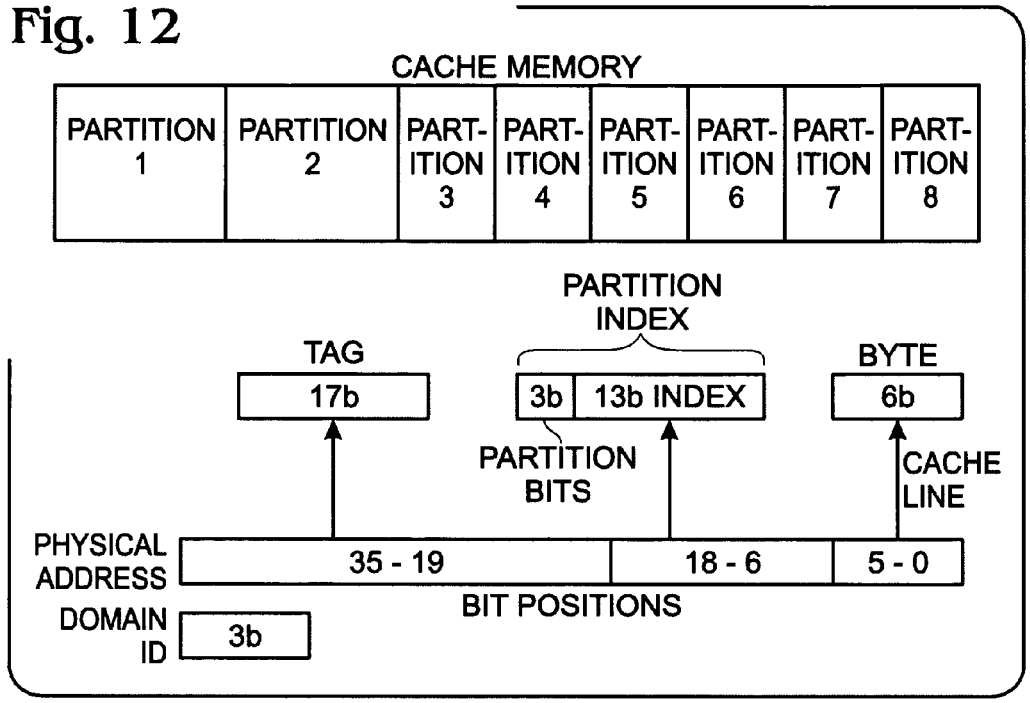
FIG. 12 depicts the process of generating a partition index with 3 partition bits.

FIG. 12 depicts the process of generating a partition index with 3 partition bits. A memory access message with a 36 b physical address and 3 b domain ID are received. The domain ID is cross-referenced to partition bits (3 b). The 6 least significant bits of the physical address are not needed, as a 6 b cache line is accessed. Bit positions 18 through 6 of the physical address are the index. Three partition bits are added to create the partition index to identify eight partitions. Bit positions 19 through 35 of the physical address form the tag.

Figure 13:
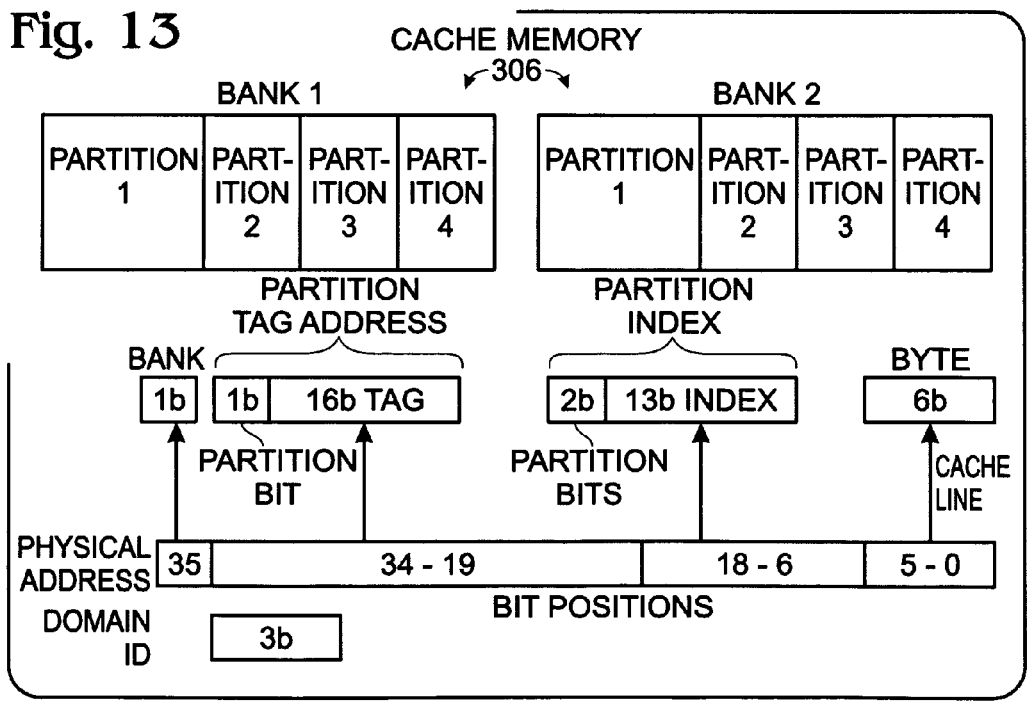
FIG. 13 depicts the process of generating a partition index, with 2 partition bits, and a bank bit.

FIG. 13 depicts the process of generating a partition index, with 2 partition bits, and a bank bit. A memory access message with a 36 b physical address and 3 b domain ID are received. The domain ID is cross-referenced to partition bits (3 b). The 6 least significant bits of the physical address are not needed, as a 6 b cache line is accessed. A single bank bit (bit position 35 of the physical address) is used to indicate either bank 1 or bank 2. Bit positions 18 through 6 of the physical address are the index. Two partition bits are added to create the partition index to identify four partitions (in the selected bank). Bit positions 19 through 34 of the physical address form a portion of the tag. One partition bit is added to the tag, to form the tag partition address.

Figure 14:
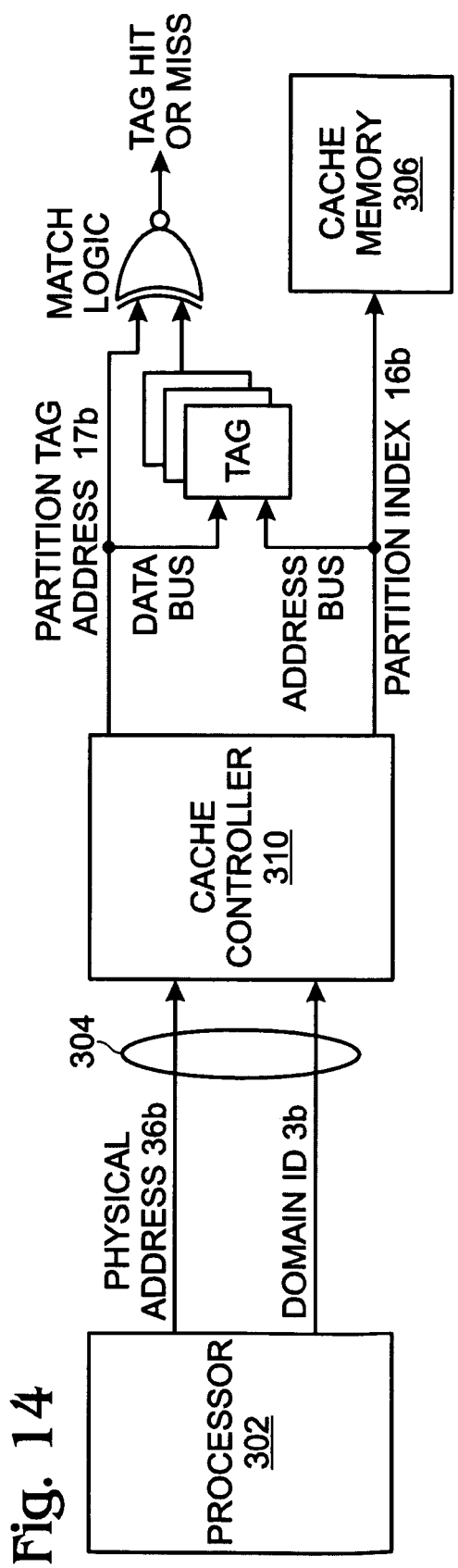
FIG. 14 is a diagram depicting the use of the partition index and partition tag address.

FIG. 14 is a diagram depicting the use of the partition index and partition tag address. Using the process of FIG. 12 as an example, a 16 b partition index is created and a 17 bit partition tag address is created. The partition tag address (data bus) and the contents of the tag (the previous partition tag address for the current partition index) are compared to determine a tag hit or tag miss. The partition index is used to access the actual memory location in cache memory.

Figure 15:
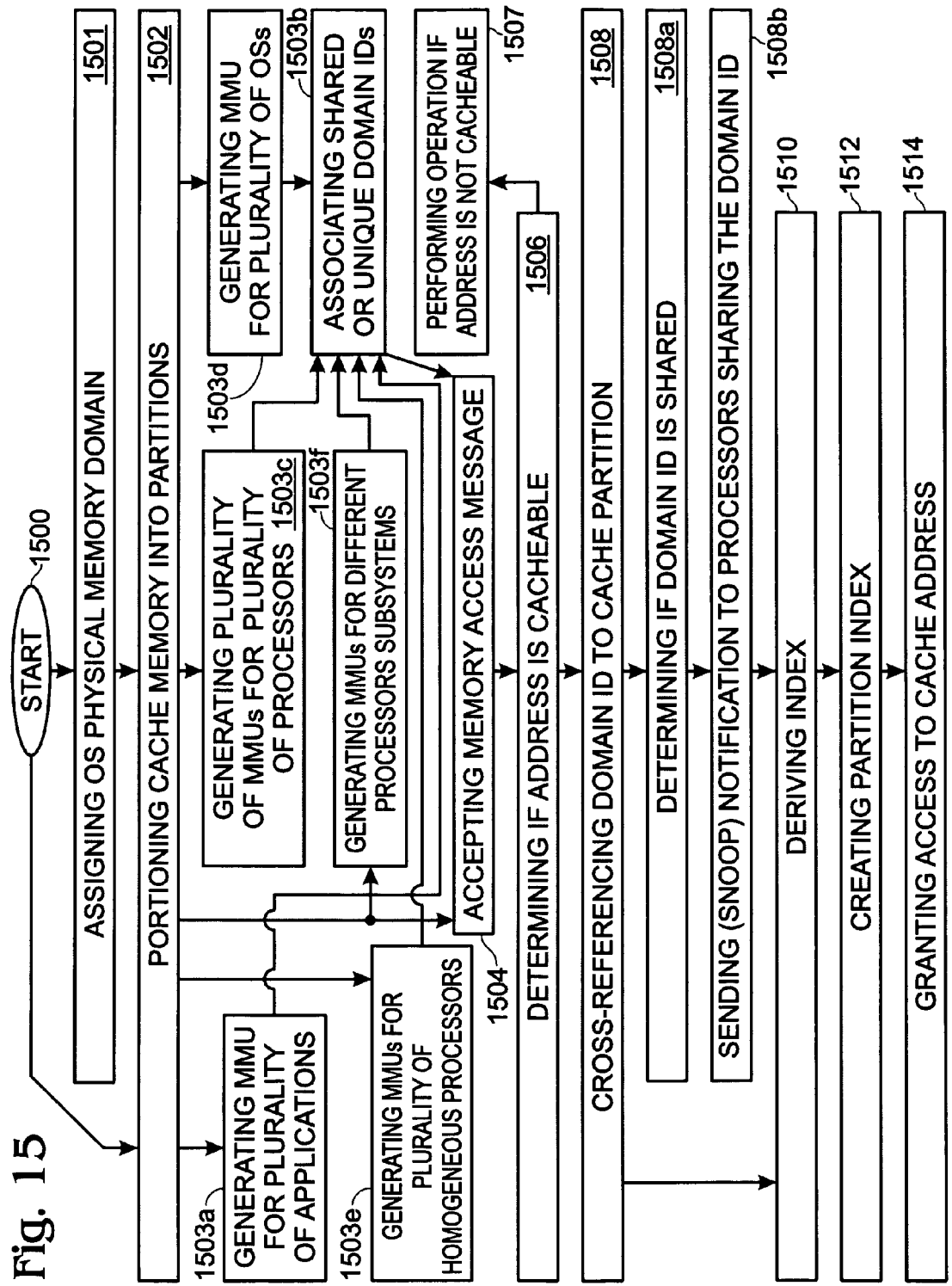
FIG. 15 is a flowchart illustrating a method for managing a cache memory in a computer system.

FIG. 15 is a flowchart illustrating a method for managing a cache memory in a computer system. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1500.

In Step 1502 a cache controller portions a cache memory into a plurality of partitions, where each partition includes a plurality of physical cache addresses. Step 1504 accepts a memory access message from the processor. The memory access message includes an address in physical memory and a domain identification (ID). Step 1506 determines if the address in physical memory is cacheable. If cacheable, Step 1508 cross-references the domain ID to a cache partition identified by partition bits. Step 1510 derives an index from the physical memory address. Step 1512 creates a partition index by combining the partition bits with the index. Step 1514 grants a processor access to an address in cache defined by partition index.

In one aspect, determining if the address in physical memory is cacheable (Step 1506) includes failing to recognize a domain ID associated with an accepted memory access message. Then, Step 1507 performs one of the following operations: ignoring the memory access message, cross-referencing the domain ID to a default cache partition, or originating a processor machine check error message.

In another aspect, accepting the memory access message in Step 1504 includes sequentially accepting a first memory access message with a first address in physical memory and a first domain ID, as well as a second memory access message with a second address in physical memory and a second domain ID. Cross-referencing the domain ID to the cache partition identified by partition bits in Step 1508 includes cross-referencing the first and second domain IDs to a shared first cache partition. Then, granting the processor access to the address in cache defined by partition index in Step 1514 includes granting access to the first and second cache addresses in the first cache partition.

In one aspect, Step 1503*a* generates an MMU with a page table map of virtual memory addresses for a plurality of applications, which are enabled as computer readable code, cross-referenced to addresses in the physical memory. Step 1503*b* associates a domain ID with each address in physical memory, where each application is assigned a unique domain ID. Then, accepting the memory access message in Step 1504 includes sequentially accepting memory access messages associated with each application, and cross-referencing the domain ID to the cache partition in Step 1508 includes cross-referencing domain IDs associated with each to application to a corresponding cache partition.

In another aspect, Step 1503*c* generates a plurality of MMUs for a corresponding plurality of processors. At least two of the processors are heterogeneous processors having different MMU algorithms for associating virtual addresses to addresses in physical memory. Each MMU includes a table map of virtual memory addresses cross-referenced to addresses in physical memory. Step 1503*b* associates a domain ID with each heterogeneous processor. Then, cross-referencing the domain ID to the cache partition in Step 1508 includes cross-referencing the domain IDs of each heterogeneous processor to a unique cache partition.

In a different aspect, Step 1503*d* generates a MMU with a page table map of virtual memory addresses for a plurality of OSs enabled as computer readable code cross-referenced to addresses in the physical memory. Then Step 1503*b* associates a domain ID with each address in physical memory, where each OS is assigned a unique domain ID. As shown in FIG. 6, this operation may involve the use of a hypervisor.

In Step 1503e a plurality of MMUs are generated for a corresponding plurality of processors, including at least two homogeneous processors. Each processor and MMU are associated with a corresponding OS, and each MMU includes a table map of virtual memory addresses cross-referenced to addresses in the physical memory. Step 1503b associates a unique domain ID with each OS, and Step 1508 cross-references the domain IDs of each OS to a unique cache partition.

In one aspect, Step 1501 assigns an OS, enabled as computer readable code, addresses in a physical memory domain at initialization. Then, portioning the cache memory into a plurality of partitions in Step 1502 includes building a partition list cross-referencing domain IDs to partition bits at initialization.

In another aspect, Step 1503f generates a plurality of MMUs for a corresponding plurality of processors, including a first subsystem with a plurality of symmetric processors, and a second subsystem with a plurality of asymmetric processors. Each MMU includes a table map of virtual memory addresses cross-referenced to addresses in the physical memory. Step 1503b associates a unique domain ID to each processor. Accepting the memory access message in Step 1504 includes sequentially accepting memory access messages from processors in the first and second subsystems, and Step 1508 cross-references the domain IDs of each processor in the first and second subsystems to a unique cache partition.

In one aspect Step 1503c generates a plurality of MMUs for a corresponding plurality of processors, including a first MMU for a first processor, a second MMU for a second processor, and a third MMU for a third processor. Each MMU includes a table map of virtual memory addresses cross-referenced to addresses in the physical memory. Step 1503b associates a shared first domain ID to the first and second processors, but not the third processor. Accepting the memory access message in Step 1504 includes accepting a memory access message from the first processor with the first domain ID, and cross-referencing the domain ID to the cache partition in Step 1508 includes substeps. Step 1508a determines if the first domain ID is shared with another processor, and since it is shared, Step 1508b sends a notification (snoop) message to the second processor, but not the third processor, that data in a shared cache partition is being accessed.

A system and method have been provided for managing cache memory in a computer system. Examples of particular message structures, processor, and hardware units have been presented to illustrate the invention. However, the invention is not limited to merely these examples. Other variations and embodiments of the invention will occur to those skilled in the art.

We claim:

1. A computer system for managing a cache memory, the system comprising:
   a processor having an address interface for sending a memory access message including an address in physical memory and a domain identification (ID);
   a cache memory portioned into a plurality of partitions, where each partition includes a plurality of physical cache addresses;
   a cache controller having an interface to accept the memory access message from the processor, the cache controller determining if the address in physical memory is cacheable, and if cacheable, cross-referencing the domain ID to a cache partition identified by partition bits, deriving an index from the physical memory address, creating a partition index by combining the partition bits with the index, and granting the processor access to an address in cache defined by partition index; and,
   wherein the cache controller sequentially accepts a first memory access message with a first address in physical memory and a first domain ID, and a second memory access message with a second address in physical memory and a second domain ID, the cache controller cross-referencing the first and second domain IDs to a shared first cache partition, and granting access to the first and second cache addresses in the first cache partition.

2. The system of claim 1 wherein the cache controller accepts a memory access message with an address in physical memory and a domain ID, and if the domain ID is not recognized, performs an operation selected from a group consisting of ignoring the memory access message, cross-referencing the domain ID to a default cache partition, and originating a processor machine check error message.

3. The system of claim 1 further comprising:
   a plurality of applications, each enabled as processor readable code; and,
   wherein the processor includes a memory map unit (AMU) with a page table map of virtual memory addresses for each application cross-referenced to addresses in the physical memory, and the domain ID associated with each address in physical memory, and where each application is assigned a unique domain ID.

4. The system of claim 3 wherein the cache controller sequentially accepts memory access messages associated with each application, cross-references domain IDs to cache partitions, and grants each application access to addresses in a corresponding cache partition.

5. The system of claim 1 further comprising:
   a plurality of processors, each processor including a memory map unit (MMU), the plurality including at least two heterogeneous processors having different MMU algorithms for associating virtual addresses to addresses in physical memory;
   wherein each MMU includes a page table map of virtual memory addresses cross-referenced to addresses in the physical memory identified, and where each heterogeneous processor is associated with a unique domain ID; and,
   wherein the cache memory includes a cache partition associated with each of the heterogeneous processors.

6. The system of claim 1 further comprising:
   a plurality of OSs enabled as computer readable code;
   wherein the processor includes a memory map unit (MMU) with a page table map of virtual addresses cross-referenced to addresses in the physical memory, where each OS is associated with a unique domain ID;
   wherein the processor receives requests to access virtual memory addresses from the plurality of OSs, accesses the MMU to recover cross-referenced addresses in physical memory and associated domain IDs, and sends the addresses in physical memory and domain IDs to the cache controller as memory access messages; and,
   wherein the cache memory includes a cache partition associated with each OS.

7. The system of claim 1 further comprising:
   a plurality of homogeneous processors;
   wherein each processor includes a memory map unit (MMU) with a page table map of virtual addresses cross-referenced to addresses in the physical memory, where each homogeneous processor is associated with a unique domain ID;
   wherein each homogeneous processor receives a request to access virtual memory addresses from a corresponding OS, accesses its corresponding MMU to recover cross-referenced addresses in physical memory and associated domain IDs, and sends the addresses in physical memory and domain IDs to the cache controller as memory access messages; and,
   wherein the cache memory includes a cache partition associated with each homogeneous processor.

8. The system of claim 1 further comprising:
an OS enabled as computer readable code;
wherein the processor includes a memory map unit (MMU) with a page table map of virtual memory addresses cross-referenced to addresses in the physical memory identified with a domain ID; and,
wherein the OS is assigned addresses in a physical memory domain at initialization, builds the page table map, and loads the page table map into the MMU; and,
wherein the cache controller builds a partition list cross-referencing domain IDs to partition bits at initialization.

9. The system of claim 1 further comprising:
a plurality of OSs enabled as processor readable code;
a first subsystem including a plurality of symmetric processors, each symmetric processor including a memory map unit (MMU);
a second subsystem including a plurality of asymmetric processors, each asymmetric processor including an MMU;
wherein each MMU includes a map of virtual memory addresses cross-referenced to addresses in the physical memory identified, where each processor in the first and second subsystems is associated with a unique domain ID;
wherein each processor from the first and second subsystems receives requests to access virtual memory locations from an OS, accesses its MMU to recover cross-referenced addresses in physical memory and associated domain IDs, and sends the addresses in physical memory and domain IDs to the cache controller as memory access messages; and,
wherein the cache memory includes a cache partition associated with each processor in the first and second subsystems.

10. The system of claim 1 further comprising:
a plurality of processors including a first, second, and third processor, each including a memory map unit (MMU);
wherein the MMUs for the first and second processors include a map of virtual memory addresses cross-referenced to addresses in the physical memory identified with a shared first domain ID, not shared with the third processor; and,
wherein the cache controller receives a memory access message with an address in physical memory and the first domain ID from the first processor, the cache controller determining if the first domain ID is shared with another processor, and if it is shared, sending a notification message to the second processor, but not the third processor, that data in a shared cache partition is being accessed.

11. In a computer system, a method for managing a cache memory, the method comprising:
a cache controller portioning a cache memory into a plurality of partitions, where each partition includes a plurality of physical cache addresses;
accepting a memory access message from the processor, the memory access message including an address in physical memory and a domain identification (M);
determining if the address in physical memory is cacheable;
if cacheable, cross-referencing the domain ID to a cache partition identified by partition bits;
deriving an index from the physical memory address;
creating a partition index by combining the partition bits with the index; and,
granting a processor access to an address in cache defined by partition index;
wherein accepting the memory access message includes sequentially accepting a first memory access message with a first address in physical memory and a first domain ID, and a second memory access message with a second address in physical memory and a second domain ID;
wherein cross-referencing the domain ID to the cache partition identified by partition bits includes cross-referencing the first and second domain IDs to a shared first cache partition; and,
wherein granting the processor access to the address in cache defined by partition index includes granting access to the first and second cache addresses in the first cache partition.

12. The method of claim 11 wherein determining if the address in physical memory is cacheable includes failing to recognize a domain ID associated with an accepted memory access message; and,
the method further comprising:
performing an operation selected from a group consisting of ignoring the memory access message, cross-referencing the domain ID to a default cache partition, and originating a processor machine check error message.

13. The method of claim 11 further comprising:
generating a memory map unit (MMU) with a page table map of virtual memory addresses for a plurality of applications enabled as computer readable code cross-referenced to addresses in the physical memory; and,
associating a domain ID with each address in physical memory, where each application is assigned a unique domain ID.

14. The method of claim 13 wherein accepting the memory access message includes sequentially accepting memory access messages associated with each application; and,
wherein cross-referencing the domain ID to the cache partition includes cross-referencing domain IDs associated with each application to a corresponding cache partition.

15. The method of claim 11 further comprising:
generating a plurality of memory map units (MMUs) for a corresponding plurality of processors, including at least two heterogeneous processors having different MMU algorithms for associating virtual addresses to addresses in physical memory, where each AMU includes a table map of virtual memory addresses cross-referenced to addresses in physical memory;
associating a domain ID with each heterogeneous processor; and,
wherein cross-referencing the domain ID to the cache partition includes cross-referencing the domain IDs of each heterogeneous processor to a unique cache partition.

16. The method of claim 11 further comprising:
generating a memory map unit (MMU) with a page table map of virtual memory addresses for a plurality of operating systems (OSs) enabled as computer readable code cross-referenced to addresses in the physical memory; and,
associating a domain ID with each address in physical memory, where each OS is assigned a unique domain ID.

17. The method of claim 16 further comprising:
generating a plurality of MMUs for a corresponding plurality of processors, including at least two homogeneous processors, where each processor and MMU are associated with a corresponding OS, and each MMU includes a table map of virtual memory addresses cross-referenced to addresses in the physical memory;
associating a unique domain ID with each OS; and,
wherein cross-referencing the domain ID to the cache partition includes cross-referencing the domain IDs of each OS to a unique cache partition.

18. The method of claim 11 further comprising:
assigning an OS, enabled as computer readable code, addresses in a physical memory domain at initialization; and, wherein portioning the cache memory into a plurality of partitions includes building a partition list cross-referencing domain IDs to partition bits at initialization.

19. The method of claim 11 further comprising:
generating a plurality of memory map units (MMUs) for a corresponding plurality of processors, including a first subsystem including a plurality of symmetric processors, and a second subsystem including a plurality of asymmetric processors, where each MMU includes a table map of virtual memory addresses cross-referenced to addresses in the physical memory;
associating a unique domain ID to each processor;
wherein accepting the memory access message includes sequentially accepting memory access messages from processors in the first and second subsystems; and,
wherein cross-referencing the domain ID to the cache partition includes cross-referencing the domain IDs of each processor in the first and second subsystems to a unique cache partition.

20. The method of claim 11 further comprising:
generating a plurality of memory map units (MMUs) for a corresponding plurality of processors, including a first MMU for a first processor, a second MMU for a second processor, and a third MMU for a third processor, where each MMU includes a table map of virtual memory addresses cross-referenced to addresses in the physical memory;
associating a shared first domain ID to the first and second processors, but not the third processor;
wherein accepting the memory access message includes accepting a memory access message from the first processor with the first domain ID;
wherein cross-referencing the domain ID to the cache partition includes:
  determining if the first domain ID is shared with another processor, and if it is shared,
  sending a notification message to the second processor, but not the third processor, that data in a shared cache partition is being accessed.

21. A computer system for managing a cache memory, the system comprising:
a processor having an address interface for sending a memory access message including an address in physical memory and a domain identification (ID);
a cache memory portioned into a plurality of partitions, where each partition includes a plurality of physical cache addresses;
a cache controller having an interface to accept the memory access message from the processor, the cache controller determining if the address in physical memory is cacheable, and if cacheable, cross-referencing the domain ID to a cache partition identified by partition bits, deriving an index from the physical memory address, creating a partition index by combining the partition bits with the index, and granting the processor access to an address in cache defined by partition index;
a plurality of applications, each enabled as processor readable code; and,
wherein the processor includes a memory map unit (MMU) with a page table map of virtual memory addresses for each application cross-referenced to addresses in the physical memory, and the domain ID associated with each address in physical memory, and where each application is assigned a unique domain ID.

22. A computer system for managing a cache memory, the system comprising:
a plurality of processors, each processor including a memory map unit (MMU), the plurality including at least two heterogeneous processors having different MMU algorithms for associating virtual addresses to addresses in physical memory, each processor having an address interface for sending a memory access message including an address in physical memory and a domain identification (ID);
a cache memory portioned into a plurality of partitions, where each partition includes a plurality of physical cache addresses;
a cache controller having an interface to accept the memory access message from the processor, the cache controller determining if the address in physical memory is cacheable, and if cacheable, cross-referencing the domain ID to a cache partition identified by partition bits, deriving an index from the physical memory address, creating a partition index by combining the partition bits with the index, and granting the processor access to an address in cache defined by partition index;
wherein each MMU includes a page table map of virtual memory addresses cross-referenced to addresses in the physical memory identified, and where each heterogeneous processor is associated with a unique domain ID; and,
wherein the cache memory includes a cache partition associated with each of the heterogeneous processors.

23. A computer system for managing a cache memory, the system comprising:
a processor having an address interface for sending a memory access message including an address in physical memory and a domain identification (ID);
a cache memory portioned into a plurality of partitions, where each partition includes a plurality of physical cache addresses;
a cache controller having an interface to accept the memory access message from the processor, the cache controller determining if the address in physical memory is cacheable, and if cacheable, cross-referencing the domain ID to a cache partition identified by partition bits, deriving an index from the physical memory address, creating a partition index by combining the partition bits with the index, and granting the processor access to an address in cache defined by partition index;
a plurality of OSs enabled as computer readable code;
wherein the processor includes a memory map unit (MMU) with a page table map of virtual addresses cross-referenced to addresses in the physical memory, where each OS is associated with a unique domain ID;
wherein the processor receives requests to access virtual memory addresses from the plurality of OSs, accesses the MMU to recover cross-referenced addresses in physical memory and associated domain IDs, and sends the addresses in physical memory and domain IDs to the cache controller as memory access messages; and,
wherein the cache memory includes a cache partition associated with each OS.

24. A computer system for managing a cache memory, the system comprising:
a plurality of homogeneous processors, each processor having an address interface for sending a memory access message including an address in physical memory and a domain identification (ID), and each processor including a memory map unit (MMU) with a page table map of virtual addresses cross-referenced to addresses in the physical memory, where each homogeneous processor is associated with a unique domain ID;
a cache memory portioned into a plurality of partitions, where each partition includes a plurality of physical cache addresses;
a cache controller having an interface to accept the memory access message from the processor, the cache controller determining if the address in physical memory is cacheable, and if cacheable, cross-referencing the domain ID to a cache partition identified by partition bits, deriving an index from the physical memory address, creating a partition index by combining the partition hits with the index, and granting the processor access to an address in cache defined by partition index;

wherein each homogeneous processor receives a request to access virtual memory addresses from a corresponding OS, accesses its corresponding MMU to recover cross-referenced addresses in physical memory and associated domain IDs, and sends the addresses in physical memory and domain IDs to the cache controller as memory access messages; and, wherein the cache memory includes a cache partition associated with each homogeneous processor.

25. A computer system for managing a cache memory, the system comprising:

a processor having an address interface for sending a memory access message including an address in physical memory and a domain identification (ID);

a cache memory portioned into a plurality of partitions, where each partition includes a plurality of physical cache addresses;

a cache controller having an interface to accept the memory access message from the processor, the cache controller determining if the address in physical memory is cacheable, and if cacheable, cross-referencing the domain ID to a cache partition identified by partition bits, deriving an index from the physical memory address, creating a partition index by combining the partition bits with the index, and granting the processor access to an address in cache defined by partition index;

an OS enabled as computer readable code;

wherein the processor includes a memory map unit (MMU) with a page table map of virtual memory addresses cross-referenced to addresses in the physical memory identified with a domain ID;

wherein the OS is assigned addresses in a physical memory domain at initialization, builds the page table map, and loads the page table map into the MMU; and, wherein the cache controller builds a partition list cross-referencing domain IDs to partition bits at initialization.

26. A computer system for managing a cache memory, the system comprising:

a processor having an address interface for sending a memory access message including an address in physical memory and a domain identification (ID);

a cache memory portioned into a plurality of partitions, where each partition includes a plurality of physical cache addresses;

a cache controller having an interface to accept the memory access message from the processor, the cache controller determining if the address in physical memory is cacheable, and if cacheable, cross-referencing the domain ID to a cache partition identified by partition bits, deriving an index from the physical memory address, creating a partition index by combining the partition bits with the index, and granting the processor access to an address in cache defined by partition index;

a plurality of OSs enabled as processor readable code;

a first subsystem including a plurality of symmetric processors, each symmetric processor including an memory map unit (MMU);

a second subsystem including a plurality of asymmetric processors, each asymmetric processor including an MMU;

wherein each MMU includes a map of virtual memory addresses cross-referenced to addresses in the physical memory identified, where each processor in the first and second subsystems is associated with a unique domain ID;

wherein each processor from the first and second subsystems receives requests to access virtual memory locations from an OS, accesses its MMU to recover cross-referenced addresses in physical memory and associated domain IDs, and sends the addresses in physical memory and domain IDs to the cache controller as memory access messages; and, wherein the cache memory includes a cache partition associated with each processor in the first and second subsystems.

27. A computer system for managing a cache memory, the system comprising:

a plurality of processors including a first, second, and third processor, each including a memory map unit (MMU) and an address interface for sending a memory access message including an address in physical memory and a domain identification (ID);

a cache memory portioned into a plurality of partitions, where each partition includes a plurality of physical cache addresses;

a cache controller having an interface to accept the memory access message from the processor, the cache controller determining if the address in physical memory is cacheable, and if cacheable, cross-referencing the domain ID to a cache partition identified by partition bits, deriving an index from the physical memory address, creating a partition index by combining the partition hits with the index, and granting the processor access to an address in cache defined by partition index;

wherein the MMUs for the first and second processors include a map of virtual memory addresses cross-referenced to addresses in the physical memory identified with a shared first domain ID not shared with the third processor; and, wherein the cache controller receives a memory access message with an address in physical memory and the first domain ID from the first processor, the cache controller determining if the first domain ID is shared with another processor, and since it is shared, sending a notification message to the second processor, but not the third processor, that data in a shared cache partition is being accessed.

* * * * *

UNITED STATES PATENT AND TRADEMARK OFFICE
CERTIFICATE OF CORRECTION

PATENT NO. : 8,176,282 B2  Page 1 of 1
APPLICATION NO. : 12/419139
DATED : May 8, 2012
INVENTOR(S) : Daniel Bouvier It is certified that error appears in the above-identified patent and that said Letters Patent is hereby corrected as shown below:

In Claim 11, column 15, line 56, the abbreviation "ID" has been incorrectly printed as "M".

In Claim 15, column 16, line 38, the abbreviation "MMU" has been incorrectly printed as "AMU".

Signed and Sealed this
Third Day of July, 2012

David J. Kappos
*Director of the United States Patent and Trademark Office*